July 14, 1931.  C. F. IRISH  1,814,446
PROCESS OF TREATING SOIL
Filed Nov. 7, 1929
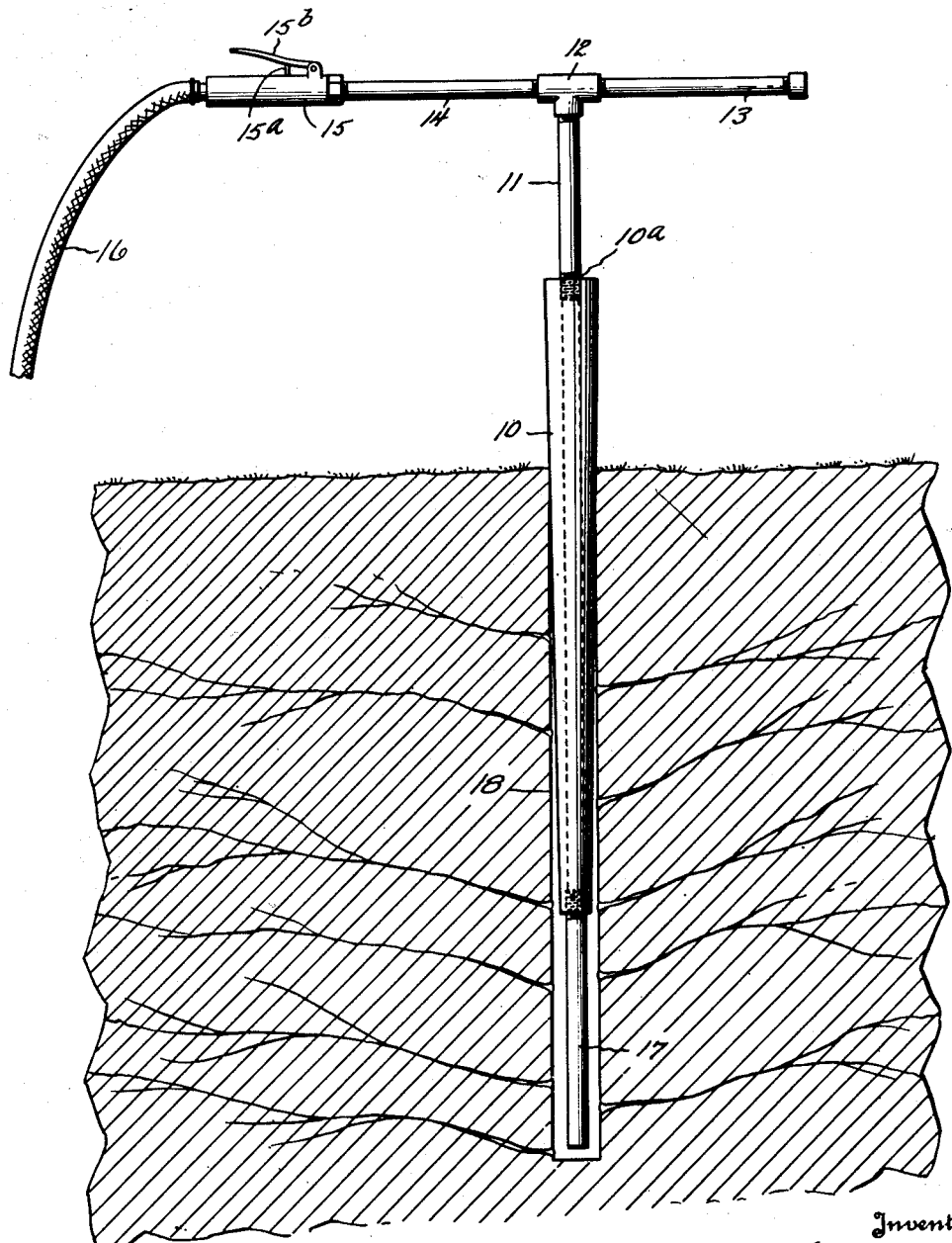

Patented July 14, 1931

1,814,446

UNITED STATES PATENT OFFICE

CHARLES F. IRISH, OF BRATENAHL, OHIO

PROCESS OF TREATING SOIL

Application filed November 7, 1929. Serial No. 405,356.

This invention relates to a process of treating soil for the purpose of aerating the same about the roots of plants or trees and at a considerable distance below the surface of the soil.

It is the general purpose and object of the invention to provide a process whereby air under high pressure may be introduced into the soil about the roots of trees or other plants in such manner as to open up immediately cracks or fissures radiating from the hole into which the air is introduced, without disturbing the lawn or plants growing upon the surface of the soil.

In the practice of the process, I employ an aeration tool so constructed that, when introduced into a suitably-formed hole such as can be made with a crowbar or auger, the tool will form a sealing fit within the upper portion of the hole and will at the same time enable the major portion of the area of the surrounding hole-wall to be subjected to the high pressure of the entering air, with the result that, because of such large exposed wall area, the soil below the top will be ruptured immediately, with the production of cracks and fissures extending radially outwardly from such ruptured wall, but without breaking up the surface of the soil. Furthermore, the tool is so constructed that it is self tamping.

A tool of this character forms the subject matter of my copending application Serial No. 328,226, filed December 24, 1928, and a similar tool is shown in the drawing wherein the view represents such tool in elevation, showing its mode of application to the soil.

Referring to the said drawing, 10 designates the body of the tool, which is in the form of a long tubular body, the exterior of which is gradually tapered from the upper to the lower end thereof, the inclination of such outer wall being approximately two degrees. The upper end of the body is provided with a threaded opening $10^a$ for the reception of the threaded lower end of the pipe 11, the upper end of which pipe is coupled into the intermediate branch of a T-coupling 12. A closed pipe 13 is threaded into one of the other branches of the coupling and a short air supply pipe 14 is threaded at one end into the opposite branch. The pipe 14 has secured to its opposite end a handle valve comprising an exterior body 15 having therein a valve of well known construction, the stem of which is indicated at $15^a$ and which is adapted to be engaged by a lever $15^b$ as the operator grips the handle, thereby to unseat the valve and permit air under pressure to be supplied to the interior of the hole through the hose 16 and the body 10 and an extension tube 17 threaded into the lower end of such body.

In using the tool to treat the soil, a hole 18 is formed in the soil, the hole being of such depth as to receive therewithin the major portion of the tool and extension and being of such diameter that the upper opening thereof will be engaged and closed by the upper portion of the tool, preferably at a distance from the top of the body 10 equal to about one-third the total length of such body. The tool is jammed tightly into the hole, whereby a seal will be formed between the tool and the upper part of the hole 18. Furthermore, because of the slight taper of the tool, there will be a great side-wall friction between the tool and the soil, and the tool will not be blown out, even under the high pressure which is employed. Furthermore, as will be evident from an inspection of the drawing, a very large area of the wall $18^a$ of the hole will be exposed to the air pressure.

In practice, I use a pressure at least as high as eighty pounds per square inch and preferably as high as two hundred pounds per square inch. By introducing air under such pressure into the hole, meanwhile having the upper portion of the hole sealed, the air operates upon the large exposed wall surface and immediately disrupts the same, thereby producing cracks and fissures as indicated in the drawing, but without disrupting the surface of the soil. Furthermore, due to the shape of the tool and to the shape of the hole and the relative diameters of the hole and tool, the tool is self-tamping and will not be blown out by the high pressure of the air supplied therethrough.

In actual practice I have employed with good results a tool wherein the length of the body 10 is about eighteen inches and the length of the extension 17 is from six inches up, and the diameter of the body 10 at about one-third of its length from the top thereof is about one and one-fourth inches.

In the practice of my process, fertilizers, insecticides, fungicides, and/or soil-correcting agents, may be and frequently are introduced into the soil in conjunction with and by means of the air, and my process enables such agents to more thoroughly and effectively impregnate the soil.

In some cases, the extension tube 17 may be omitted and a spud substituted therefor having outlet openings the combined areas whereof are at least equal to the cross sectional area of the interior of the body 10.

Having thus described my invention, what I claim is:

1. The process of treating soil which consists in pre-forming a hole of material depth therein, supplying air under high pressure, through a tool introduced into said hole, to the bottom of the hole and thence to the major portion of the wall area of such hole, surrounding said tool, and maintaining a seal between said tool and the upper portion of said hole whereby the soil will be disrupted immediately radially outwardly from the portion of the wall so treated without escaping upwardly around the tool.

2. The process of treating soil which consists in pre-forming a hole of material depth therein, supplying air under high pressure through a tool introduced into said hole into the bottom of the hole and thence to the major portion of the wall area of such hole, surrounding said tool, and maintaining a seal between the upper portion of the body of said tool and the upper portion only of said hole whereby the major portion of the area of the wall of the hole will be subjected to such air pressure and the soil surrounding such wall will be disrupted immediately radially outwardly from the portion of the wall below such seal.

3. The process of treating soil which consists in preforming a hole of material depth therein, sealing by a tool introduced into such hole the upper portion only of the wall of said hole and at the same time forming a chamber surrounding the tool, which chamber diminishes in cross-sectional area from the bottom of the chamber to the sealed upper end thereof, and delivering air under high pressure through said tool into the lower portion only of said hole, whereby the wall of the chamber will be subjected to such high pressure and the soil surrounding such wall will be disrupted immediately radially outwardly.

In testimony whereof, I hereunto affix my signature.

CHARLES F. IRISH.